Dec. 13, 1966      R. J. WENZEL      3,292,075
STRIPLINE FILTER HAVING COINCIDING PASS BANDS AND STOP
BANDS AND DEVICES UTILIZING THE SAME
Filed April 30, 1964      9 Sheets-Sheet 1

KURODA'S IDENTITIES

INVENTOR.
R. J. WENZEL
BY
Richard J. Seger
ATTORNEY

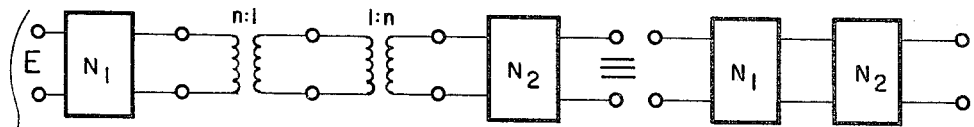
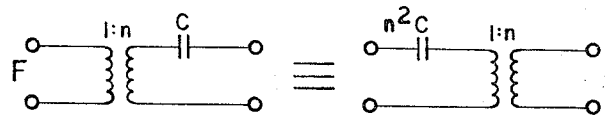
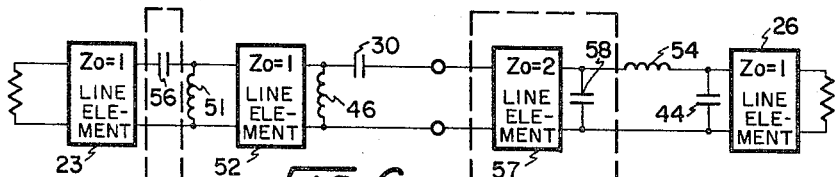
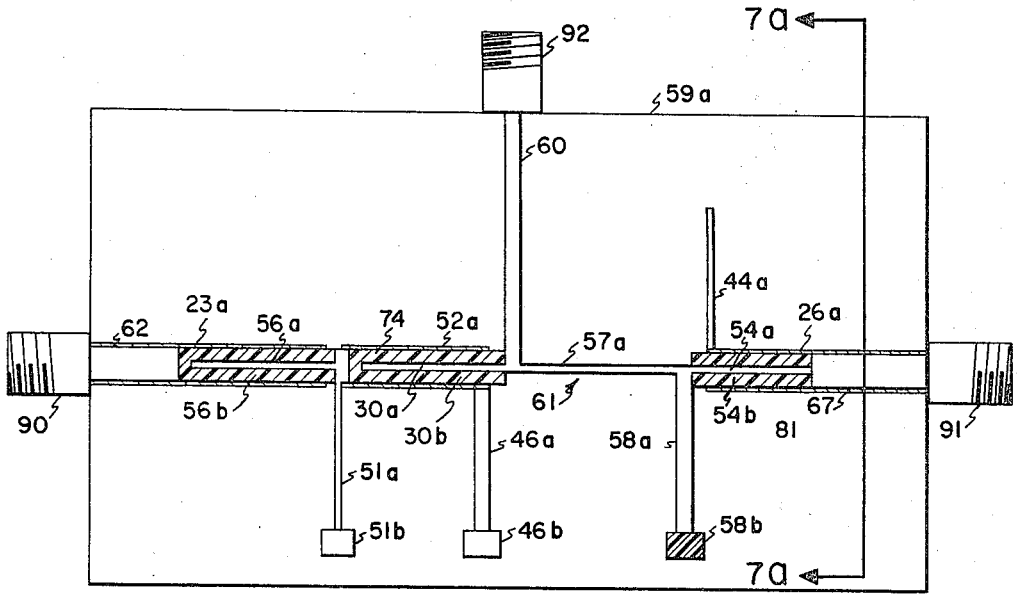
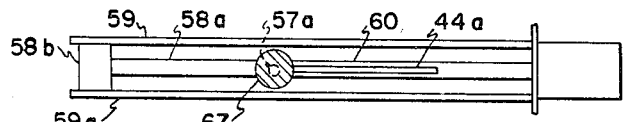

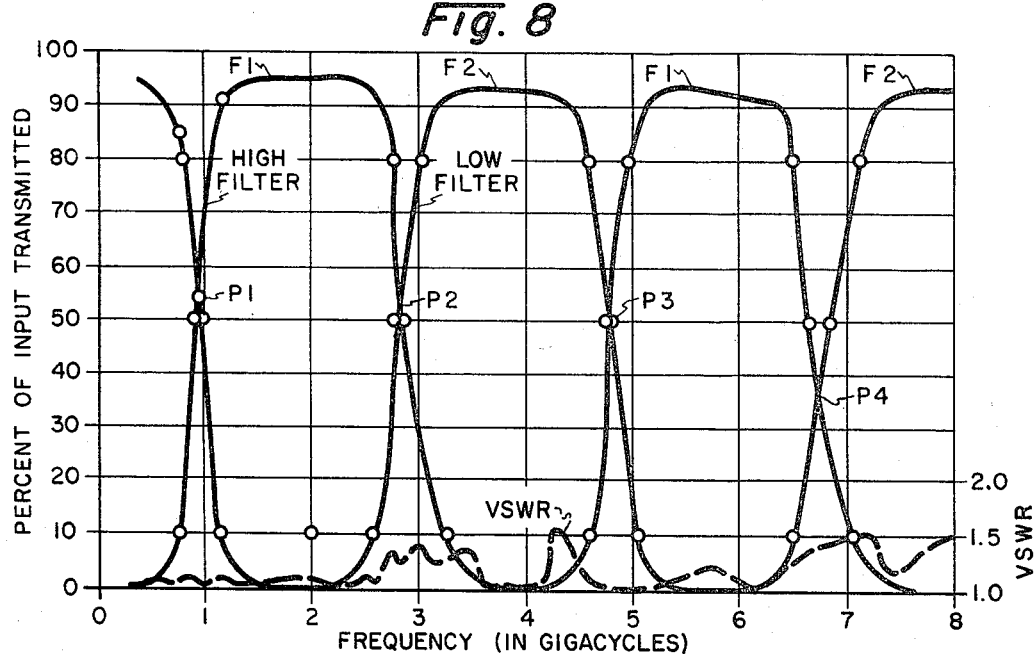
Fig. 8
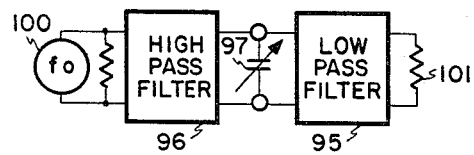
Fig. 9
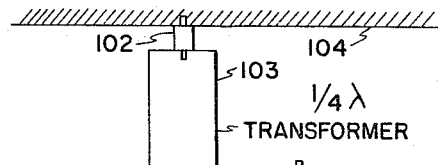
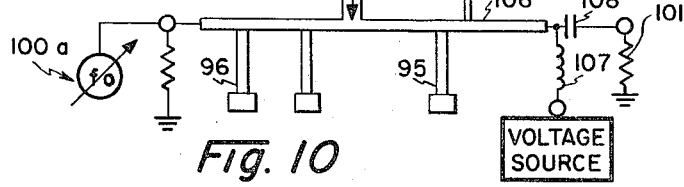
Fig. 10
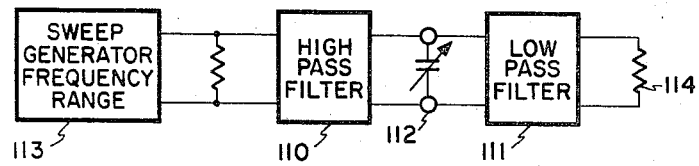
Fig. 11

INVENTOR.
R.J. WENZEL
BY
Richard J. Seeger
ATTORNEY

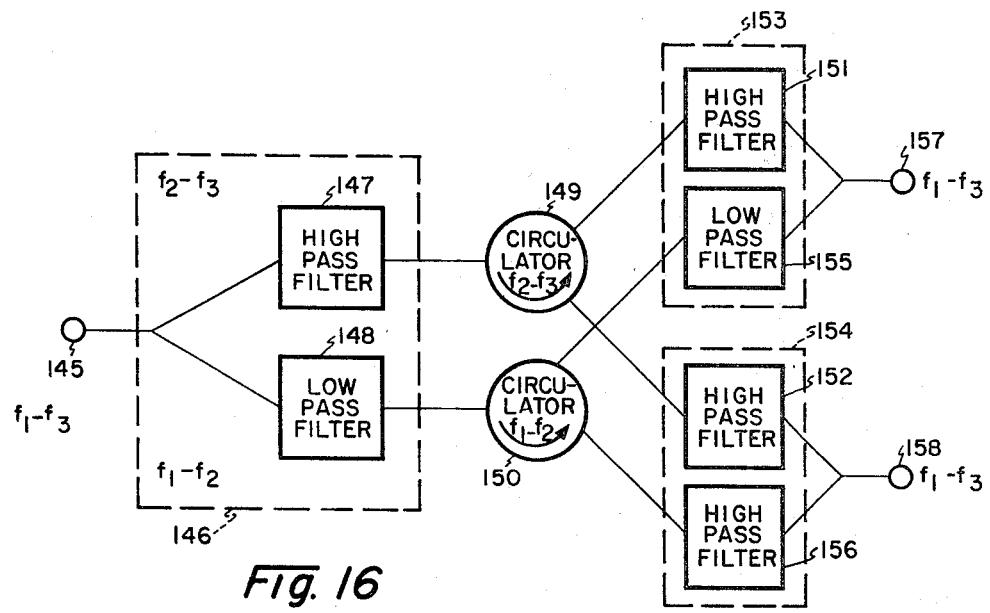
Fig. 16
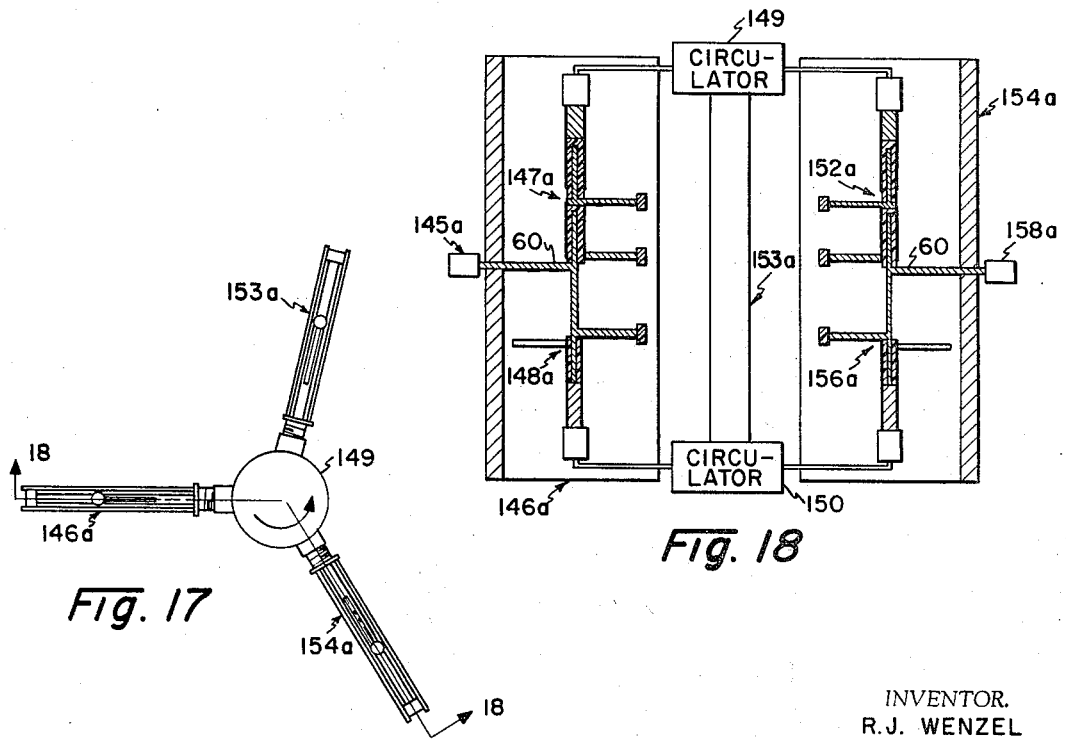
Fig. 17
Fig. 18
INVENTOR.
R.J. WENZEL

Dec. 13, 1966  R. J. WENZEL  3,292,075
STRIPLINE FILTER HAVING COINCIDING PASS BANDS AND STOP
BANDS AND DEVICES UTILIZING THE SAME
Filed April 30, 1964  9 Sheets-Sheet 9

INVENTOR.
R.J. WENZEL

BY

*Richard J. Seeger*

ATTORNEY

United States Patent Office 3,292,075
Patented Dec. 13, 1966

3,292,075
STRIPLINE FILTER HAVING COINCIDING PASS BANDS AND STOP BANDS AND DEVICES UTILIZING THE SAME
Robert J. Wenzel, Oakland County, Mich., assignor to The Bendix Corporation, Southfield, Mich., a corporation of Delaware
Filed Apr. 30, 1964, Ser. No. 363,793
13 Claims. (Cl. 321—69)

This invention pertains to a complementary filter for microwave frequencies and to devices utilizing the principles of this complementary filter to greatly increase their operating range and operating characteristics. More particularly, this invention provides for the design of a complementary filter that is capable of operating at very high frequencies in the microwave range that requires distributed constant impedances, rather than the more easily determined and obtained lumped constant impedance. This invention provides filters with distributed constant impedances of exact values thereby resulting in increased, and almost infinite, filter bandwidth, low insertion loss, and low VSWR. This invention makes available devices of increased bandwidth that previously were not possible or were much more expensive.

A complementary filter is comprised of two filters, one a high pass filter and the other a low pass filter which are said to complement one another. This means that their reactive components cancel each other so that when connected in series the sum of their input impedances is a constant or their input impedance appears resistive, and when connected in parallel the sum of their input admittances is a constant or their input admittance appears to be resistive. Also, this invention includes devices wherein the impedance values are chosen so that the sum of the input admittances, or input impedances, is equal to a value that varies by a predetermined small amount from a constant to provide for narrower crossover characteristics for a given number of filter sections. Also, they have transfer responses that complement one another, i.e. where one filter has a pass band, the other filter has a stop band.

When complementary filters are used at lower frequencies, it is a fairly simple manner to design a circuit wherein their reactive components cancel one another. This is true because at low frequencies the conventional "lumped constant" theories may be used to provide the filtering. Lumped constant theory is only possible when the length of the electrical component such as an inductor, capacitor, or a resistor, is very small when compared to the average wave length which is being used, so that the effect of the electrical component appears lumped at an infinitesimally small point. However, at microwave frequencies in the range of 1–20 gigacycles, the wave lengths become very small, as small as 1.5 cm., and the physical length of the electrical components no longer appear infinitesimally small so that the lumped constant theory cannot be used and instead the "distributed constant theory" must be used. It is significantly more difficult to design and manufacture distributed constant components and in the past it has been thought feasible to design only approximate distributed constant value devices, thus resulting in devices which had limited operating characteristics.

This invention solves this problem by providing a transformation between lumped constant values, which may easily be computed for complementary filter action, and distributed constant values which are necessary to provide the precise electrical characteristics at microwave frequencies. This invention also provides hardware, which may be termed "flat plate coaxial" hardware for providing the distributed constants in a simple compact design.

This invention also utilizes the above mentioned transformation teaching to provide sweep generators, circulators, isolators, and harmonic multipliers, all of exceptional bandwidth and also to provide diplexers and multiplexers.

The bandwidth of the harmonic multipliers and sweep generators may be improved by connecting the high pass and low pass filters in a complementary filter in parallel and placing between the filters and in parallel therewith a varactor. A varactor is a device which will provide a multiple of the input frequency at its output.

The bandwidth of circulators and isolators may be improved by first dividing a wide bandwidth signal into two smaller bandwidth signals and then feeding each divided signal into an isolator (or circulator) and then recombining the output with a complementary filter.

It is therefore an object of this invention to provide a complementary filter which can operate at microwave frequencies and has exact distributed constant values for its electrical components thereby making it capable of very wide, almost infinite, bandwidth and improved electrical characteristics.

It is a further object to provide devices such as sweep generators, circulators, isolators, and harmonic multipliers, of exceptional bandwidth, low insertion loss and low VSWR in a simplified inexpensive manner.

It is an object of this invention to provide diplexers and multiplexers capable of breaking a bandwidth of microwave frequencies down into smaller bandwidth segments.

These and other objects will become more apparent when preferred embodiments of this invention are explained in connection with the drawings in which:

FIGURES 1–6 are a series of simplified schematic wiring diagrams which show the transformation between a lumped constant circuit to a distributed constant circuit;

FIGURE 7 is a partially sectional elevational view of a preferred embodiment "flat plate coaxial" complementary filter;

FIGURE 7a is a section taken at 7a—7a of FIGURE 7;

FIGURE 8 is a curve showing the output of the device of FIGURE 7;

FIGURE 9 is a simplified box diagram of a harmonic multiplier of this invention;

FIGURE 10 is a schematic diagram ilustrating in more detail than FIGURE 9 the hardware used in constructing the preferred embodiment of FIGURE 9 and also showing hardware that can be used in the construction of the embodiment of FIGURE 11;

FIGURE 11 is a simplified box diagram of a sweep generator of this invention having increased frequency range;

FIGURE 16 is a wide band circulator of this invention;

FIGURES 17 and 18 are respectively plan and elevational views of schematic diagrams of flat plate coaxial hardware used in a wide band circulator.

*Synthesis of a distributed element circuit*

Figure 1:
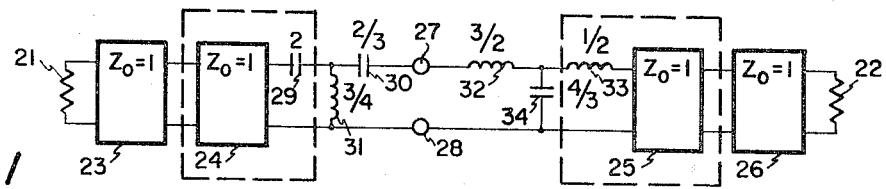

In FIGURES 1–6 is shown a synthesis of a distributed element circuit starting with a lumped constant circuit which is to be transformed, with the use of various identities and equivalences, into a distributed constant circuit which can be made into TEM mode flat plate coaxial hardware to provide exact distributed constant values and hence provide greatly increased bandwidth. In FIGURE 1 is shown a schematic circuit which has an output resistance 21 and an output resistance 22 located at opposite ends of the circuit. Line elements 23, 24, 25 and 26 are placed in the circuit and each have a characteristic impedance of one. These are used to enable the transformation to the distributed circuit.

Assume that the left half of the circuit, that being the components to the left of terminals 27, 28, is the high pass filter having capacitor 29, of two farads, capacitor 30 with a value of two-thirds farad and an inductor 31 with a value of three-quarters henry. The low pass filter would be to the right of terminals 27 and 28 and have inductor 32 of three-halves henry, inductor 33 of one-half henry and capacitor 34 of four-thirds farad. Assume the values given for electrical components will provide a complementary filter for the microwave frequencies. However, since we are dealing with microwave frequencies we cannot use a circuit with lumped constants of these values but instead must synthesize a circuit having distributed constants equivalent to these values.

Figure 2:
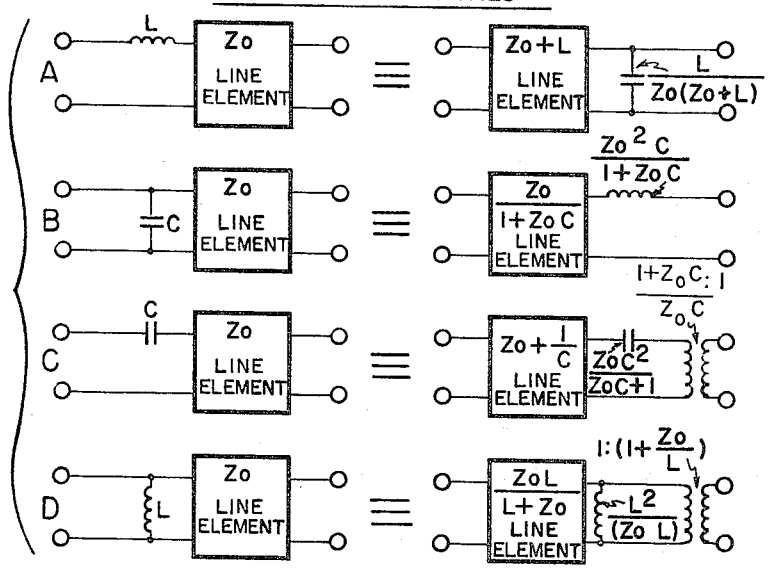
Figure 3:
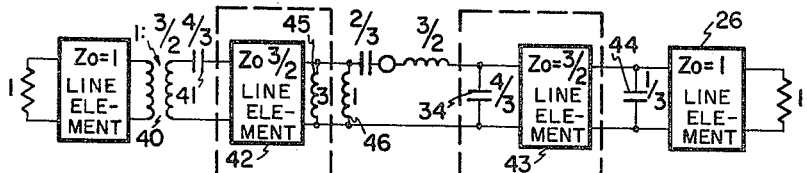

The first step in doing this is to use the "Kuroda's Identities" A, B, C and D shown in FIGURE 2. By using identity C, line element 24 and capacitor 29 are transformed into transformer 40 (FIGURE 3) having a one to three-halves ratio, capacitor 41 of four-thirds farad and line element 42 with a characteristic impedance of three-halves, as shown in FIGURE 3. Also, identity A is used to transform inductor 33 and line element 25 in FIGURE 1 into line element 43 with a characteristic impedance of three-halves and capacitor 44 with a value of one-third farad shown in FIGURE 3.

Then, inductor 31 (FIGURE 1) with a value of three-quarters henry is divided into inductors 45, 46 in FIGURE 3 with values of three henrys and one henry respectively. Inductors 45 and 46 are equivalent to inductor 31 and the reason for "splitting" inductor 31 will become evident in the next step. Identity D (FIGURE 2) is used to transform line element 42 (FIGURE 3) and inductor 45 in FIGURE 3 into transformer 50 (FIGURE 4) having a three-halves to one ratio, inductor 51 having a value of two henrys and line element 52 having a characteristic impedance of one. Also identity B (FIGURE 2) is used to change capacitor 34 in FIGURE 3 and line element 43 into line element 53 (FIGURE 4) with a characteristic impedance of one-half and inductor 54 with a value of one henry in FIGURE 4.

In FIGURE 5 is shown two transformer identities E and F which will be used in the following steps.

Figure 4:
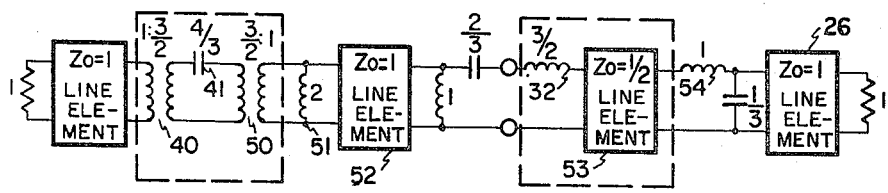

Capacitor 41 in FIGURE 4 is moved to the left of transformer 40 by means of transformer identity F shown in FIGURE 5 to obtain capacitor 56 (FIGURE 6) with a value of three farads. This then leaves the two opposing transformers 40 and 50 in FIGURE 4 which by means of transformer identity E in FIGURE 5 can be eliminated. Next, identity A in FIGURE 2 is used to transform inductor 32 (FIGURE 4) and line element 53 in FIGURE 4 to line element 57 (FIGURE 6) with a characteristic impedance of two and shunt capacitor 58 with a value of three-halves farads as shown in FIGURE 6. Now we have a practical realization of the distributed constant circuit that is equivalent to the lumped constant circuit of FIGURE 1. The next step is to transform the schematic shown in FIGURE 6 into hardware for realizing these distributed values and this is done to obtain the embodiment of FIGURE 7.

*Flat plate coaxial embodiment of FIGURE 7*

In FIGURES 7 and 7a is shown a hardware embodiment of the circuit diagram shown in FIGURE 6. The input is applied to metallic rod 60 having a .138 inch diameter in this embodiment. Rod 60 terminates at, and is transverse to complementary filter 61 which is comprised of several series and shunt sections corresponding to and numbered after the inductances and capacitances in FIGURE 6. The hardware to the right of input 60 on filter 61 comprises the low pass filter and the hardware to the left of rod 60 comprises the high pass filter in the complementary filter.

Series section 56a is .077 inch in diameter and is enclosed by a Teflon sleeve 56b which is .116 inch in diameter and this section corresponds to capacitor 56 in FIGURE 6. The right end or base of section 56a is .138 inch in diameter and is connected to transverse or shunt rod 51a which is .060 inch in diameter and carries at its end a shorting block 51b of metallic construction which is in contact with the two parallel metal plates 59, 59a (FIGURE 7a) which are placed above and below the rod 60 and filter 61 and act as ground planes. Rod 51a corresponds to inductor 51 in FIGURE 6.

The section 30a is .019 inch in diameter and is enclosed by a Teflon sleeve 30b with a diameter of .116 inch and provides the capacitance 30 in FIGURE 6. The outside of Teflon sleeves 56b and 30b are covered by thin metallic cylinders 23a, 52a which are open at one end to receive respectively series elements 56a and 30a and which together with ground planes 59, 59a constitute, respectively, line elements 23 and 52 of FIGURE 6.

Shunt rod 46a is of a metallic construction and is connected at its inner or base end to line element 30b and is shorted at its outer end to the ground planes 59, 59a by means of metallic block 46b. Rod 46a corresponds to inductor 46 in FIGURE 6 and is .138 inch in diameter. Section 57a is .060 inch in diameter, corresponds to line element 57 in FIGURE 6 and has extending from the right end thereof a shunt bar 58a which is .184 inch in diameter and corresponds to capacitance 58 in FIGURE 6. The end of bar 58a is insulated from the ground planes 59, 59a by Teflon block 58b. Series section 54a is .035 inch in diameter, surrounded by a Teflon sleeve 54b which is .116 inch in diameter which in turn is inserted in the open end of metallic cylinder or line element 26a and extends to the closed end of element 26a and acts as inductance 54 in FIGURE 6. Extending transversely from the outer surface of the open end of element 26a is shunt rod 44a which is .062 inch in diameter and acts as capacitance 44 in FIGURE 6. FIGURE 7a is a section taken along 7–7a of FIGURE 7 and shows the relationship of the ground planes 59, 59a to the rod configuration in FIGURE 7 and to the supporting block 58b. Since this is a TEM mode propagation filter and since the ground planes are flat plates, applicant, as mentioned, has coined the term "flat plate coaxial" to describe his novel structure. Since the device in FIGURE 7 does operate in the TEM mode, coaxial cable connections may be made directly to the ends of line rod 61 at 90, 91 and also to the end of input rod 60 at 92.

The "effective" lengths of impedance elements 56a, 30a, 57a, 54a, 51a, 46a, 58a and 44a are one-quarter of the "average" wave length for which this filter is designed to operate. In the preferred embodiment, "average" wave length may be defined as the wave length of the center frequency in the first complete pass-stop filter band which center frequency would be approximately 1.9 gigacycles in FIGURE 8 for the first pass-stop band which extends from about 0.9 to 2.8 gigacycles. Also, "effective" length is the length of component in which would exist a quarter wave length, which might be different than a quarter wave length in freespace. For example, a length of line must be decreased when the element is encased in dielectric to have the same effective length. This decrease is determined by dividing by the square root of the dielectric constant of the dielectric.

Figure 19:
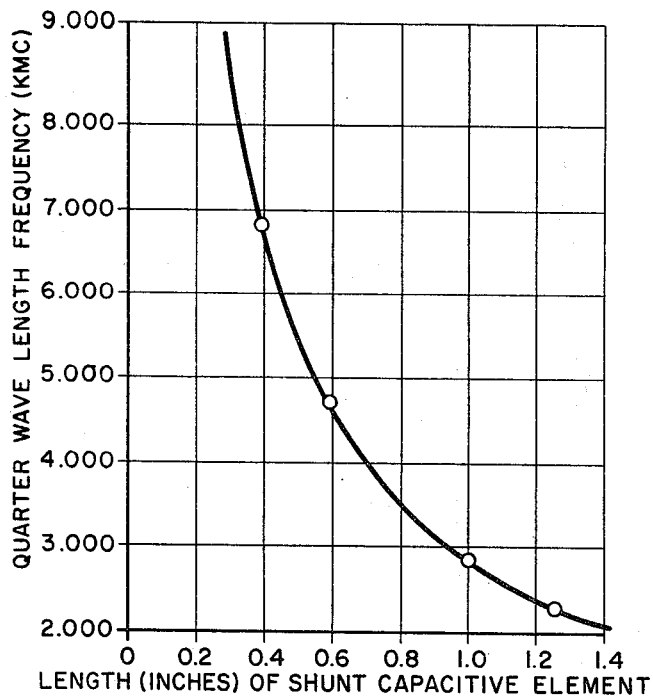
FIGURES 19–22 are charts used to determine the element lengths for various frequencies of operation and for various types of components.
Figure 20:
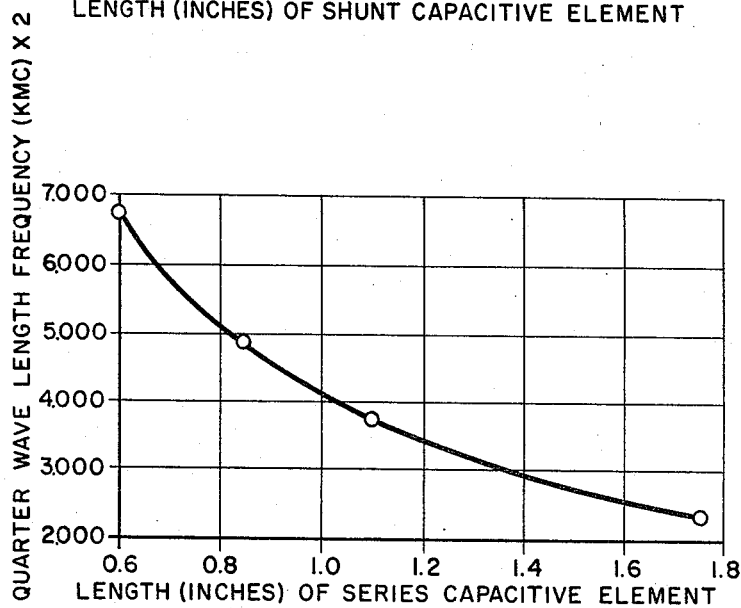
Figure 21:
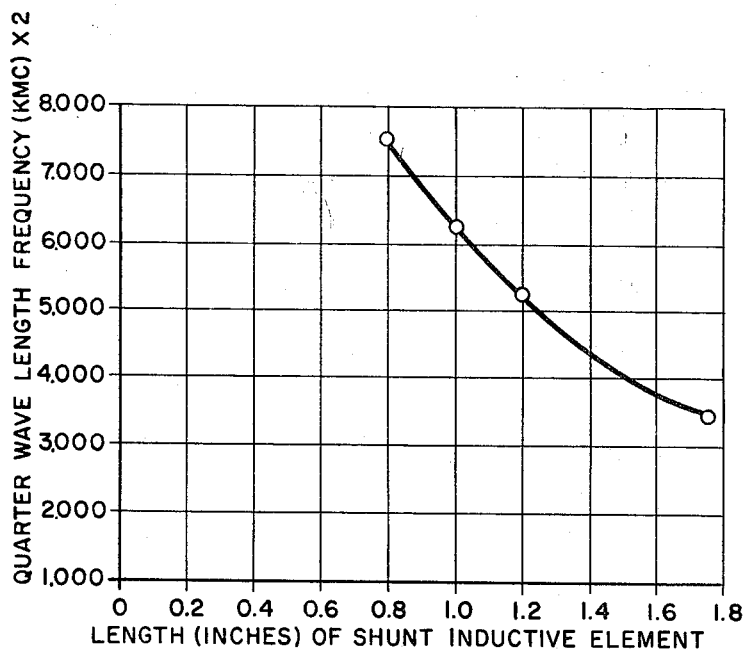
Figure 22:
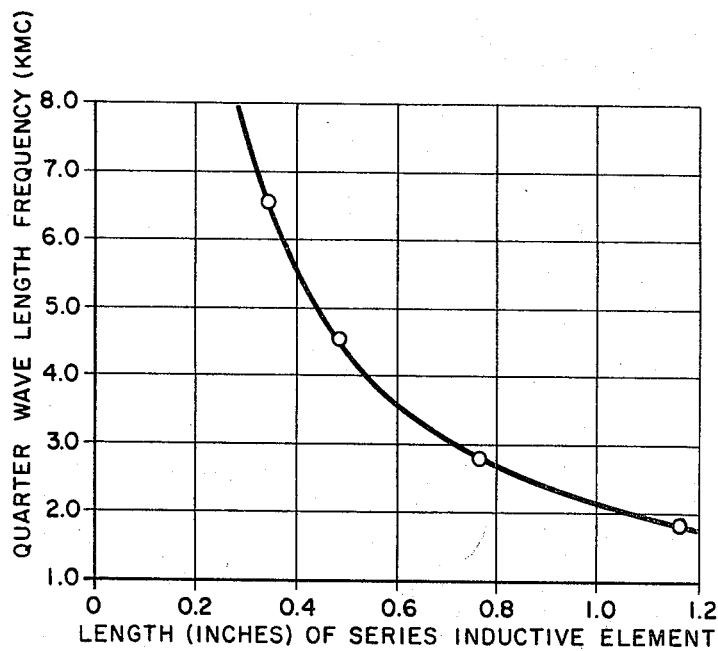

Theoretically the impedance elements while having a defined length, have zero diameter and when the length to diameter ratio is sufficiently large, the diameter may be assumed to be zero. However, as the frequency increases, and the length of the components become smaller so that the length to diameter ratio decreases, adjustments to the length should be made to achieve the desired results. These adjustments can be empirically determined and in FIGURES 19–22 such determination has been made. In FIGURE 19 a curve for a shunt capacitive element is shown with the abscissa being the length in inches and the ordinate being the quarter wave length frequency. It is seen that as the frequency increases, the change in length of the element becomes less for a given frequency change. The same general relation is true for series capacitive element shown in FIGURE 20, for shunt inductive element shown in FIGURE 21 and for series inductive elements shown in FIGURE 22. In FIGURES 20 and 21 the ordinate is twice the quarter wave length frequency because measurable nulls occur at twice the quarter wave frequency, i.e., a pass-band exists at the quarter wave frequency.

The spacing between ground planes 59, 59a and line elements 23a, 52a, 26a and 57a determine the characteristic impedance of these line elements. This spacing is controlled by controlling the diameter of the sleeves and cylinder and is logarithmically related thereto. The larger the spacing, the larger the characteristic impedance.

The spacing between shunt rods 51a, 46a, 58a and 44a and ground planes 59, 59a determines the impedance of these components and is logarithmically related thereto. This spacing is controlled by controlling the diameter of rods 51a, 46a, and 58a. The capacitive values vary inversely as the spacing and the inductive values vary directly as the spacing.

The spacing between series rods 56a, 30a, and 54a and their respective line element 23a, 52a and 26a determine respectively the impedance and is logarithmically related thereto. This spacing is controlled by controlling the diameter of rods 63, 64 and 66. Here also the capacitive values vary inversely as the spacing and the inductive values vary directly as the spacing.

The frequency maximum of this device is affected by the axial spacing between elements 23a, 52a and 26a and the base of their respective series elements 56a, 30a and 54a. The spacing in this embodiment is .060 inch and, generally, the smaller the allowable spacing, the higher the maximum frequency obtainable. The spacing can be adjusted empirically for optimum performance in each application.

By using the proper spacings and the identities in FIGURES 2 and 5, almost any filter network can be designed accurately for improved performance in accordance with this invention.

FIGURE 8 shows a graph of the (experimentally measured) response of a device like that shown in FIGURE 7 wherein percent of the input transmitted at the output is plotted along the ordinate and frequency is plotted along the abscissa. As can be seen from FIGURE 8, the curves for the low pass filter and the curves for the high pass filter are complementary in that where one has a pass band the other has a stop band and "cross-over" at points $P_1$, $P_2$, $P_3$ and $P_4$. Due to the exact values of impedances that are obtainable with this invention, and the periodic nature of TEM lines a multiple of low and high frequency filter repetitions which are substantially uniform, can be obtained. In devices of the prior art for filters at this frequency, the bandwidth, or a number of uniform repetitions of stop and pass bands for each filter was limited to one because of the non-exact impedances used. In this discussion the low filter is the filter that perfectly passes D.C. and has pass bands centered about even multiples of the quarter wave frequency, which occur at 4, 8, 12, 16 gc. with 4 and 8 gc. being shown in FIGURE 8, and the high filter is the filter section that perfectly stops D.C. and has pass bands centered about odd multiples of the quarter wave frequency which occur at frequency 2, 6, 10, 14 gc. etc. of which 2 and 6 gc. are shown in FIGURE 8. Also, the measured VSWR, which is shown in the dashed irregular curve, is shown to have a maximum of about 1.6, and for the first past stop band is less than 1.1 which is much improved over the prior art. The VSWR was measured at the input port 92 and is an indication of the resistive nature of the input impedance, with the lower the VSWR, the higher the resistive nature.

*Harmonic multiplier of FIGURES 9 and 10*

This invention also includes the combination, shown in FIGURES 9 and 10, of a complementary filter like that shown in FIGURE 7 along with a varactor diode for providing a harmonic multiplier. In the schematic of FIGURE 9 is shown a low pass filter in box 95 and a high pass filter in box 96 with a varactor diode 97 being connected in shunt with filters 95, 96. A varactor diode is a device which can multiply frequencies and is used with the complementary filter which separates the input frequency from the output frequency. In the embodiment of FIGURES 9 and 10, an input 100 is connected to filter 96, and at output 101 the frequency will be doubled.

The hardware embodiment of this harmonic multiplier is shown in FIGURE 10 where the output filter 95 and input filter 96 are shown in a rod configuration comparable to that of FIGURE 7 and diode 102 is shown between a transformer 103, which matches the diode impedance to line 105, and a ground plane 104. Connected to line 106 is bias 107 for the diode 102 and capacitor 108 prevents the D.C. bias current flow to the output line.

This embodiment can be cascaded by feeding the output 101 to the input of a second multiplier and so on until the desired number of stages is obtained.

*Sweep generator of FIGURE 11*

Another embodiment of this invention is shown in FIGURE 11 wherein the high pass filter 110 and low pass filter 111 and varactor diode 112 are similar in arrangement and design to those shown in FIGURE 10 and connected in combination with a sweep generator 113, which has a frequency range of "R." Output load 114 is connected to low pass filter 111 and has double the frequency range of generator 113. In the past, in order to double the frequency range of a sweep generator, a very expensive complicated circuitry was necessary. Now, with this invention, the frequency range of a sweep generator can be doubled with a relatively simplified, compact, sturdy device connected in the manner shown in FIGURE 11. The actual hardware may be that of FIGURE 10 where generator 100a represents a sweep frequency generator.

This embodiment may likewise be cascaded by applying the output to an input of a second sweep generator multiplier circuit and so on until the desired number of stages is obtained.

Figure 12:
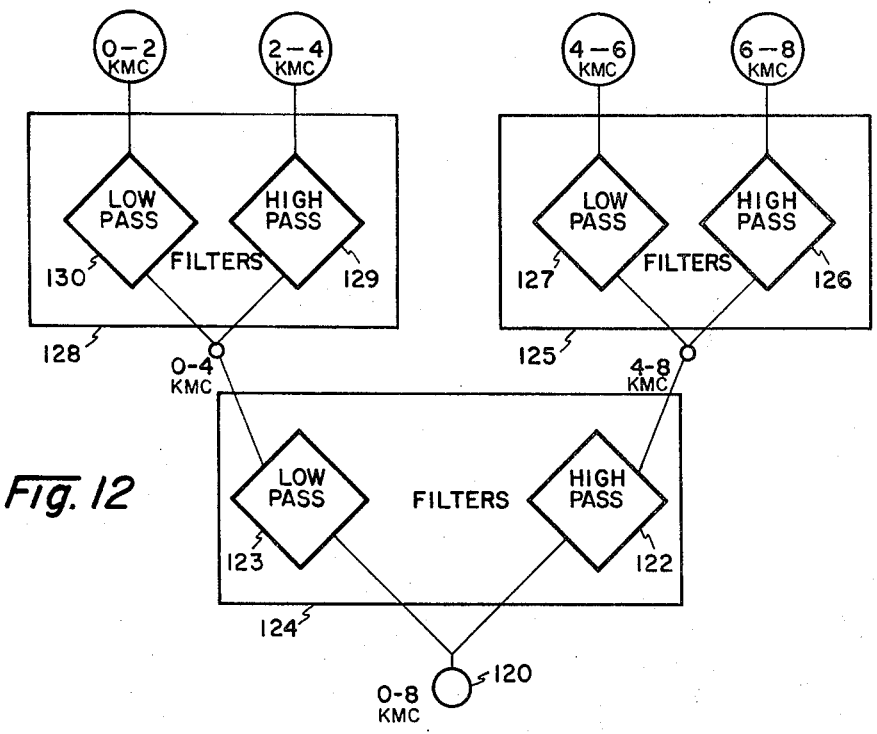
FIGURE 12 is a multiplexer of this invention which has a wide band microwave input that is divided into many smaller bandwidth segments at its output.
Figure 13:
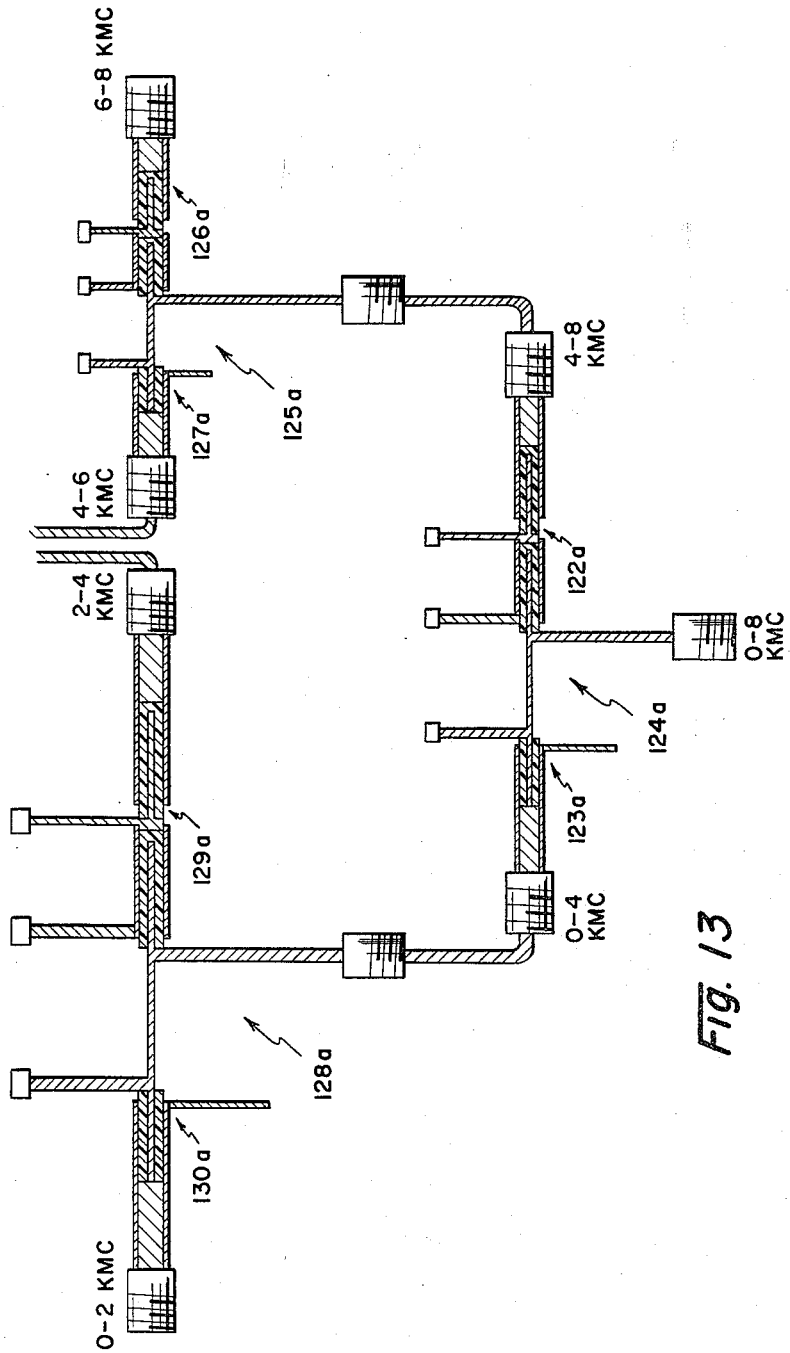
FIGURE 13 is a schematic diagram of flat plate coaxial hardware used in a multiplexer.

*Multiplexer of FIGURES 12 and 13*

A further embodiment of this invention is shown in FIGURE 12 where complementary filters, such as that shown in FIGURE 7, can be used to break down a relatively wide band high frequency signal into smaller bands having bandwidths which can be modulated or otherwise controlled by devices in the art which have limited bandwidth capabilities.

In FIGURE 12 the input signal of 0–8 kmc. range is applied at 120 and is fed to a first complementary filter 124 having high pass section 122 and low pass section 123. The output of high pass section 122 will be the upper half of the input frequency, 4–8 kmc., and this in turn is fed to a second complementary filter 125 having high pass section 126 and low pass section 127 which divides again the higher half of the input frequency and so forth until the frequency is sufficiently divided for the purpose at hand. In similar manner, the low pass frequency sends the lower half, 0–4 kmc., of the input frequency to a third complementary filter 128 which has high and low pass sections 129 and 130 respectively which also carry out a dividing function. This again improves over the devices known to the art for this type of dividing action.

FIGURE 13 shows the multiplexer of FIGURE 12 wherein the boxes 122–130 are replaced by flat plate coaxial filter hardware 122a–130a which hardware is similar in construction to that of FIGURES 7 and 7a. The elements in filter 124a are smaller than those in filter 128a and larger than those in filter 125a due to the frequency differences in the filters. The ground planes are not shown.

Figure 14:
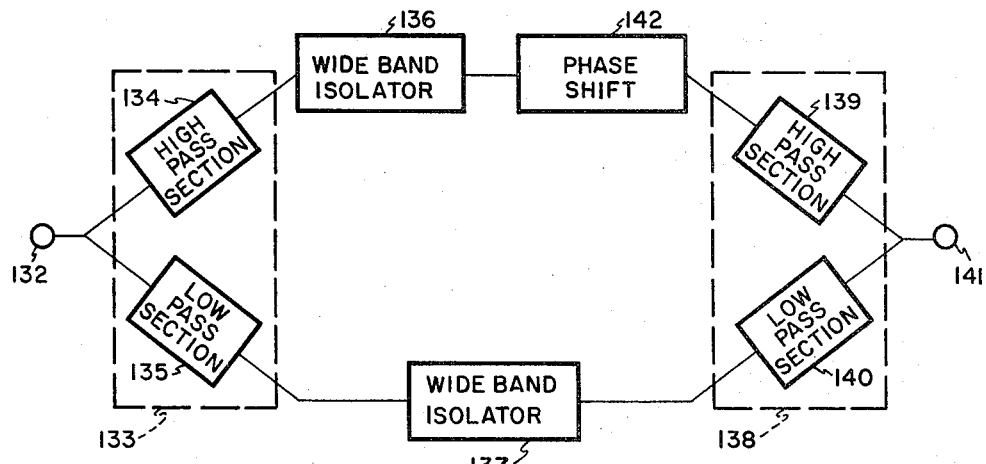
FIGURE 14 is a wide band isolator of this invention.
Figure 15:
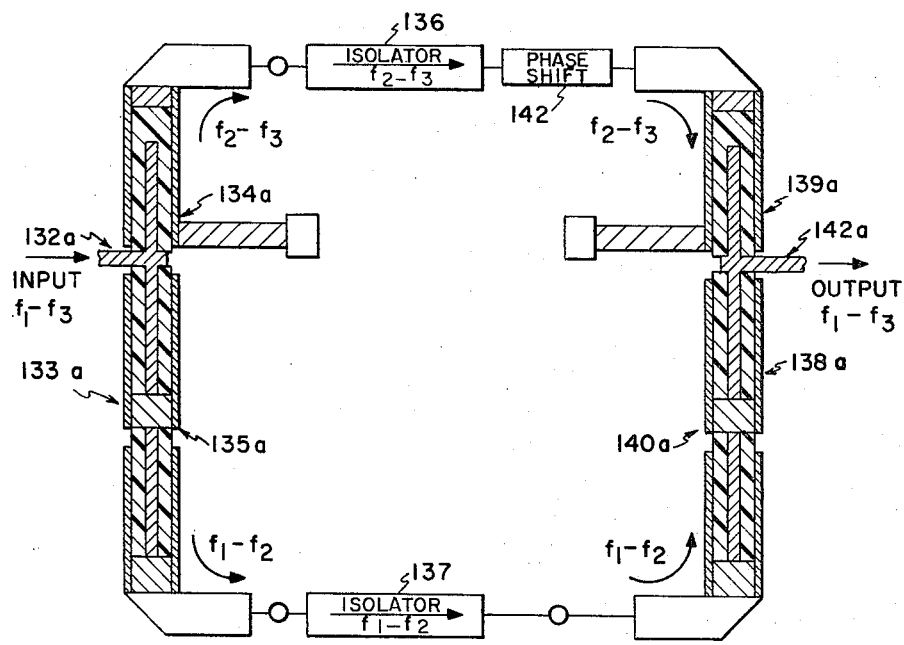
FIGURE 15 is a schematic diagram of flat plate coaxial hardware used in a wide band isolator.

*Isolator of FIGURES 14 and 15*

Another important embodiment of this invention is shown in FIGURE 14 which utilizes complementary filters of the kind shown in FIGURE 7 in combination with conventional bandwidth commercially available isolators to provide a large bandwidth isolator. The input port 132 is connected to a first complementary filter 133 having high pass section 134 and low pass section 135 which divide the frequency from port 132. The upper half of the frequency is sent to an isolator 136 of bandwidth capabilities equal to one-half of the bandwidth at the port 132 and a similar bandwidth isolator 137 is connected to the low pass filter 135. The outputs from isolators 136, 137 are then recombined through complementary filter 138 having high pass section 139 and low pass section 140 to provide a wide bandwidth signal at port 141. A phase correcting network 142 is placed between isolator 136 and high pass section 139 to compensate for any phase differences that may occur due to any difference in phase changing properties of isolators 136 and 137. Network 142 may be comprised of a length of line which is designed to correct for any phase differences. The length of line may be computed if the exact characteristics of isolators 136 and 137 are known, or more simply, the length of line may be varied until the output corresponds exactly to the input. FIGURE 15 is a wide band isolator reduced to a hardware schematic, with filters 133a and 138a being constructed in accordance with the teaching for the embodiment of FIGURES 7 and 7a. It is seen that the series, shunt and line elements vary from the FIGURE 7 embodiment which of course would be true when a filter of different impedance values and number of sections is designed.

This embodiment can be cascaded by building two filters on a first filter as in the manner of the multiplexer of FIGURES 12 and 13 and then when the discrete number of divisions has taken place, connect an isolator to each open port and then with a similar number of filters, recombine until a single output is obtained.

*Circulator of FIGURES 16, 17 and 18*

A still further important embodiment of this invention is shown in FIGURE 16 wherein the bandwidth of commercially available circulators are increased by combination with the complementary filters of this invention to provide a wide band circulator. At port 145 a signal of wide band frequency is connected to a first complementary filter 146 having a high pass section 147 and low pass section 148 where it is divided with one-half going to a circulator 149 and the lower half going to one port of a circulator 150. The output ports of circulator 149 are connected to the high pass sections 151 and 152 of complementary filters 153, 154 respectively while the other two output ports of circulator 150 are connected to the low pass sections 155, 156 of complementary filters 153, 154 respectively to provide combination high and low output signals at ports 157, 158 thereby making possible at these high frequencies circulator action of exceptionally large bandwidth using circulators which have only normal bandwidth range. FIGURES 17 and 18 are plan and elevation views, respectively, showing a flat plate coaxial hardware embodiment of a wide band circulator. This embodiment may also be cascaded to provide increased bandwidth by providing a multiplex arrangement in the manner of FIGURES 12 and 13 until the desired number of stages is obtained, adding circulators, and then recombining to a three port device in the manner shown in FIGURE 16.

The filter of this invention conducts in the TEM mode and is operable for all frequencies, including frequencies from D.C. to 20 gigacycles but for practical purposes, the most useful frequency range is 1–10 gigacycles. At frequencies on the low side of this range the hardware becomes quite long, e.g., at 100 megacycles one-fourth wave length would be about 30 inches, and at frequencies above this range, the distance between the open end of the line elements and the nearest shunt element becomes quite small and tolerances become very close.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:
1. Apparatus for filtering radiant energy comprising ground plane members,
first, second, and third ports being spaced apart,
said ports being located at spaced points on the periphery of said ground plane members,
at least one TEM mode propagation component for providing a distributed constant impedance to said radiant energy being between said first and second ports to comprise a first filter section,
at least one TEM mode propagation component for providing a distributed constant impedance to said radiant energy being between said second and third port to comprise a second filter section,
said components being insulated from said ground plane members for a predetermined distance along the length thereof,
each of said first and second filter sections having a plurality of pass bands and stop bands, with the pass bands of one of said sections coinciding with the stop bands of the other of said sections to form pass-stop bands,
the pass bands of one filter section crossing over the stop bands of the other filter section as approximately the half power point along said bands, the points of said crossings being located sufficiently near said half power point to provide an input VSWR of less than 2.0 for all frequencies to 20 gigacycles.
2. The apparatus of claim 1 with the length of said TEM components being an effective quarter wave length of a frequency that is substantially in the middle of the frequency range of the first complete pass-stop band of said first and second filter sections.
3. The apparatus of claim 1 with
means for providing an input of given bandwidth at one of said ports,
means for receiving the lower half of said bandwidth at another of said ports,
means for receiving the upper half of said bandwidth at the remaining port.
4. A first filter apparatus as defined in claim 1,
a second filter apparatus as defined in claim 1,
a third filter apparatus as defined in claim 1,
means for providing an input of given bandwidth at one of said ports in said first apparatus,
means for receiving the lower half of said bandwidth at another of said ports in said first apparatus,
means for receiving the upper half of said bandwidth at the remaining port in said first apparatus,
the means for receiving the lower half of said bandwidth in said first filter apparatus comprising a port of said second filter apparatus and the means for receiving the upper half of said bandwidth at the remaining port of the first filter apparatus being a port of the third filter apparatus.

5. A first filter apparatus as defined in claim 1,
a second filter apparatus as defined in claim 1,
a third filter apparatus as defined in claim 1,
a first and second circulator, each having three terminals,
two ports of said first filter apparatus being connected to corresponding terminals of said circulators,
two ports of said second filter apparatus being connected to corresponding terminals of said circulators,
two ports of said third filter apparatus being connected to corresponding terminals of said circulators,
whereby the remaining ports of each of said first, second and third filter apparatus provide connecting terminals of a wide band three port circular.

6. The apparatus of claim 1 with
a varactor being positioned at one of said ports,
means for applying an input frequency at another of said ports,
means for receiving a frequency which is a multiple of the input frequency at the remaining port,
matching means between said varactor and filter sections to match said varactor with said filter sections.

7. A first filter apparatus as defined in claim 1,
a second filter apparatus as defined in claim 1,
two isolators, each having an input and an output with energy flow being possible only in the forward direction from the input to the output of an isolator,
two ports of said first filter apparatus connected to the inputs of said two isolators,
two ports of said second apparatus connected to the outputs of said two isolators,
so that an input frequency bandwidth applied to the third port of said first apparatus will be divided with a portion going to one of said isolators and a portion going to the other of said isolators, and so that said second apparatus recombines the portions from said isolators with the recombined signal appearing at the third port of said second filter apparatus.

8. The apparatus of claim 7 with
said means for applying an input frequency comprising a sweep frequency generator of given bandwidth,
said means for receiving a multiplied input providing a sweep frequency generator of increased bandwidth.

9. The apparatus of claim 7 with
phase shift means connected between the output of one of said isolators and said second apparatus to compensate for any phase shift difference of the signal in said isolators.

10. Apparatus for filtering radiant energy comprising ground plane members,
first, second, and third ports being spaced apart,
said ports being at the periphery of said ground plane members,
at least one TEM mode propagation component for providing a distributed constant impedance to said radiant energy being between said first and second port to comprise a first filter section,
at least one TEM mode propagation component for providing a distributed constant impedance to said radiant energy being between said second and third port to comprise a second filter section,
said components being insulated from said ground plane members for a predetermined distance along the length thereof.
each of said first and second filter sections having a plurality of pass bands and stop bands, with the pass bands of one of said sections coinciding with the stop bands of the other of said sections to form pass-stop bands,
said first and second filter sections having the sum of their input impedances when connected in series vary from a constant by an amount which will enable an input VSWR of less than 2.0 for all frequencies to 20 gigacycles, and having the sum of their input admittances when connected in parallel vary from a constant by an amount which will enable an input VSWR of less than 2.0 for all frequencies to 20 gigacycles.
said filter sections having a line element of cylindrical conductive material,
at least one of said cylindrical line elements being open inside thereof and having an open and closed end,
said line element being spaced from each of said ground plane members with the spacing determining and being proportional to the characteristic impedance of said line elements,
said filter sections having a series element, and each of said series elements being of conductive material having a base at one end and the other end being inserted in said open end of said line element,
said series element being spaced and insulated for a predetermined distance along its length from said cylindrical line element with said spacing determining and being proportional to the inductance or capacitance of said series element,
said series element being a capacitive element when it is spaced and insulated from the walls of said line element cylinder along its entire length, and being an inductive element when conductively connected to said line element at a predetermined distance along its length,
the maximum frequency of the apparatus being related to the spacing between the open end of said line element and the base of the series element inserted therein.

11. The apparatus of claim 3 with at least one of said line elements being a solid cylinder.

12. The apparatus of claim 3 with
said filter sections having a shunt element,
each of said shunt elements being of conductive material having a base at one end which is electrically and conductively connected to the outer surface of one of said line elements and a series element,
said shunt elements having an end opposite to the base end which opposite end extends substantially transversely from said line element and parallel to said ground plane members,
a predetermined distance of the length of said shunt element being insulated from said ground plane members and said shunt element being capacitive when said shunt element is insulated from said ground plane members along its entire length and said shunt element being inductive when said shunt element is shorted to said ground plane members at a predetermined point along the length thereof,
the impedance value of said shunt element varying logarithmically with the spacing between said shunt element and said ground plane members.

13. The apparatus of claim 5 with
the closed end of a first open cylinder line element being connected to one of said ports,
an end of a first series element being inserted in said first line element and insulated from the said first line element to form a capacitive element,
a second open cylinder line element having the outer surface of its closed end connected to the base of said first series element,
a first shunt element having its base connected to outer surface of the closed end of said second line element, and the opposite end of said first shunt element being shorted to said ground plane members to provide an inductance element,
an end of a second series element being inserted in said second line element and insulated from the closed end of said line element to form a capacitive element,
a second shunt element having its base connected to the outer surface of the open end of said second line element and the opposite end of the second shunt element being shorted to said ground plane members to provide an inductance element, said second port being connected to the base of said second series element, a third line element of a solid cylinder being conductively connected at one end to said second port, a third shunt element having its base connected to the other end of said third line element and having its opposite end insulated from the ground plane members thereby providing a capacitive element, a fourth open cylinder line element having its base conductively and directly connected to the third port, a fourth shunt element having its base connected conductively to the outer surface of the open end of said fourth line element and the other end of said fourth shunt element being insulated from said ground plane members, said fourth shunt element having its other end extending in an opposite direction from said third shunt element, an end of a third series element being inserted in the open end of said fourth line element and the opposite end of said end of said third series element being conductively connected to the closed end of said fourth line element thereby providing an inductance.

References Cited by the Examiner

UNITED STATES PATENTS

| | | | |
|---|---|---|---|
| 2,214,041 | 9/1940 | Brown. | |
| 2,426,633 | 9/1947 | Mason | 333—73 X |
| 2,976,498 | 3/1961 | Locus | 333—73 X |
| 2,984,798 | 5/1961 | Bryan | 333—73 X |
| 3,009,120 | 11/1961 | Robson | 333—72 |
| 3,194,976 | 7/1965 | Ludwig et al. | 307—88.5 |

OTHER REFERENCES

Electronics, October 11, 1963, pages 23–28.

IRE Trans. on Circuit Theory, vol. CT–5, No. 3, September 1958, pages 172–181.

HERMAN K. SAALBACH, *Primary Examiner.*

P. L. GENSLER, *Assistant Examiner.*